Sept. 28, 1937.  H. A. ROSE  2,094,376
VAPOR ELECTRIC CONVERTER
Filed Oct. 23, 1935   4 Sheets-Sheet 4

WITNESSES:

INVENTOR
Herbert A. Rose.
BY
ATTORNEY

Patented Sept. 28, 1937

2,094,376

UNITED STATES PATENT OFFICE 2,094,376

VAPOR-ELECTRIC CONVERTER

Herbert A. Rose, Pittsburgh, Pa., assignor to Westinghouse Electric & Manufacturing Company, East Pittsburgh, Pa., a corporation of Pennsylvania Application October 23, 1935, Serial No. 46,383

15 Claims. (Cl. 175—363)

My invention relates to a vapor-electric converter and particularly to a control system for a converter of the make-alive type.

In make-alive type converters individual valves having a suitable anode and a vaporizable cathode are provided with a make-alive electrode in contact with the cathode for initiating a new cathode spot at the beginning of each conducting period in the valve, and the individual valves are suitably separated from each other, preferably by providing each of the valves with a suitable individual container so that the valves are unaffected by the operating conditions of the several remaining valves.

Such valves may be utilized for conveying current or electric energy between alternating and direct-current circuits, or between direct-current circuits and alternating currents, or between alternating-current circuits of the same or different frequency.

In the control of make-alive type converters the application of current to the make-alive electrodes is sometimes quite critical. Also, it is desired to apply the make-alive current with a substantially steep wave front, so that it rapidly rises above the critical current of the electrode so that the exact instant of the formation of the cathode spot may be definitely controlled.

After the formation of the cathode spot, it is desirable to have the current flow terminate at a time prior to the termination of the normal conducting period of the valve, and usually as soon after the formation of the cathode spot as is possible, in order to prevent unnecessary heating of the make-alive electrodes and energy loss in the make-alive system.

It is, accordingly, an object of my invention to provide a control system which will apply a make-alive impulse having a substantially steep wave front and having means for controlling the duration of the current impulse to the make-alive electrode in accordance with the duty being performed by the valve.

It is a further object of my invention to provide a control system in which the instant of current flow to the make-alive electrode may be readily controlled to control the output current or voltage of the converter.

It is a further object of my invention to provide a control system in which the duration of current flow to the make-alive electrode may be made responsive to the load condition of the converter.

Other objects and advantages of my invention will be apparent from the following detailed description, taken in conjunction with the accompanying drawings, in which.

Figure 1:
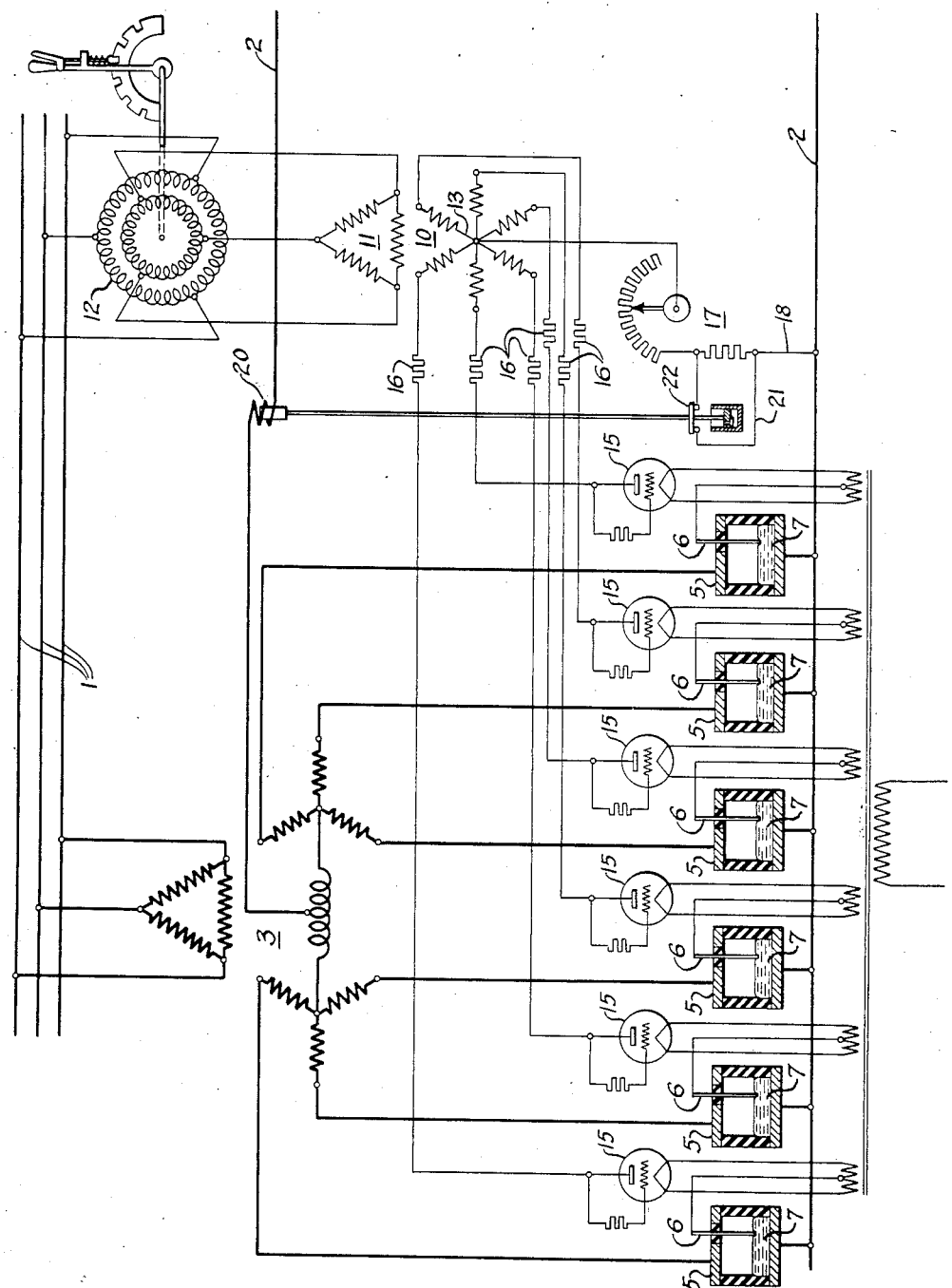
Figure 1 is a schematic illustration of a conversion system embodying a preferred form of my invention.

In the embodiment of my invention, as illustrated in Fig. 1, an alternating current circuit 1 and a direct-current circuit 2 are connected by means of a suitable transforming arrangement 3, the terminals of which are connected to the valves 5 of a suitable make-alive type valve converter. Each of the valves 5 of the converter is provided with a make-alive electrode 6 in contact with the cathode 7, which is illustrated as being connected to one side of the direct-current circuit 2.

A suitable source of actuating potential is provided for supplying current to the make-alive electrode 6. In the event the device is used to convert alternating current to direct current, or if the frequency of the alternating-current circuit is fixed by some suitable means, this source may be the alternating-current circuit 1. A suitable actuating device, such as an actuating transformer 10, has a primary 11 connected to the actuating source preferably through a suitable phase-shifting device 12 which I have illustrated as of the induction regulator type although any suitable device may be used.

The actuating device 11 may be used to multiply the phases of the source of control potential to any desired number. Preferably, the actuating transformer 10 is provided with a winding 13 which provides phase terminals corresponding to the effective phase terminals of the converter transformer 3. As illustrated, I have shown the converter transformer 3 as double three-phase, thereby producing six effectual phases in the converter transformer, while I have shown the actuating device 10 having a secondary winding 13 connected for six-phase diametrical operation.

Each phase terminal of the actuating device 10 is connected to the corresponding make-alive electrode 6 of the main converter. Preferably this connection contains a suitable uni-directional conductor, such as a hot cathode valve 15. The return connection 18 from the make-alive electrodes 6 to the actuating device 10 is made directly to the cathodes 7 of the make-alive valves 5. Each of the connections to the make-alive electrodes 6 is provided with a suitable resistor 16 having a relatively low resistance value. The return connection 18 from the make-alive electrodes 6 to the actuating device 10 is provided with a resistor 17 having a value much greater than the value of the resistor 16 in the connections between the device 10 to the make-alive electrodes 6. Preferably, the resistance 17 is made adjustable so that it acts as an adjustable load on the uni-directional conductors 15 in series with the make-alive electrodes 6, so that the make-alive current shifts from phase to phase of the actuating device 10 in a manner similar to the commutation of current between the successive phases of a polyphase rectifier.

In the operation of my system as so far described, the actuating potential is applied through the actuating device 10 to the make-alive electrodes 6 of the several valves 5 of the converter and the phase of the output current of the actuating device 10 adjusted by means of the phase-shifting device 12 to initiate a cathode spot in the several valves 5 of the converter at the desired instant to produce the proper output potential of the converter. The resistance of the resistor 17 in the return connection 18 is then adjusted to provide the desired interval of current conduction through the make-alive electrodes 6.

It is frequently desirable to vary the instant of application of current or the duration of current flow through the make-alive electrodes 6 in response to the load condition of the converter. For this purpose, I have provided a load responsive relay 20 in the circuit 2 and a shunting circuit 21 around a portion of the resistor 17 and provided contacts 22, operative by the load responsive relay 20 to open or close the shunt circuit 21 in response to the load conditions of the line 2. While the shunt circuit 21 may be operated either normally closed or normally opened, I prefer to operate the shunt circuit 21 normally closed and make the load responsive relay 20 responsive to overload, so that in the event of an overload the relay 20 will open the shunt circuit 21 and increase the resistance 17 in the return circuit of the actuating device 10, and thereby decrease the conducting interval of the make-alive electrode 6 and delay the instant of formation of the cathode spot in the several valves 5 of the converter, so that the terminal voltage of the converter will be reduced, which will tend to reduce the overload condition on the converter.

Figure 3:
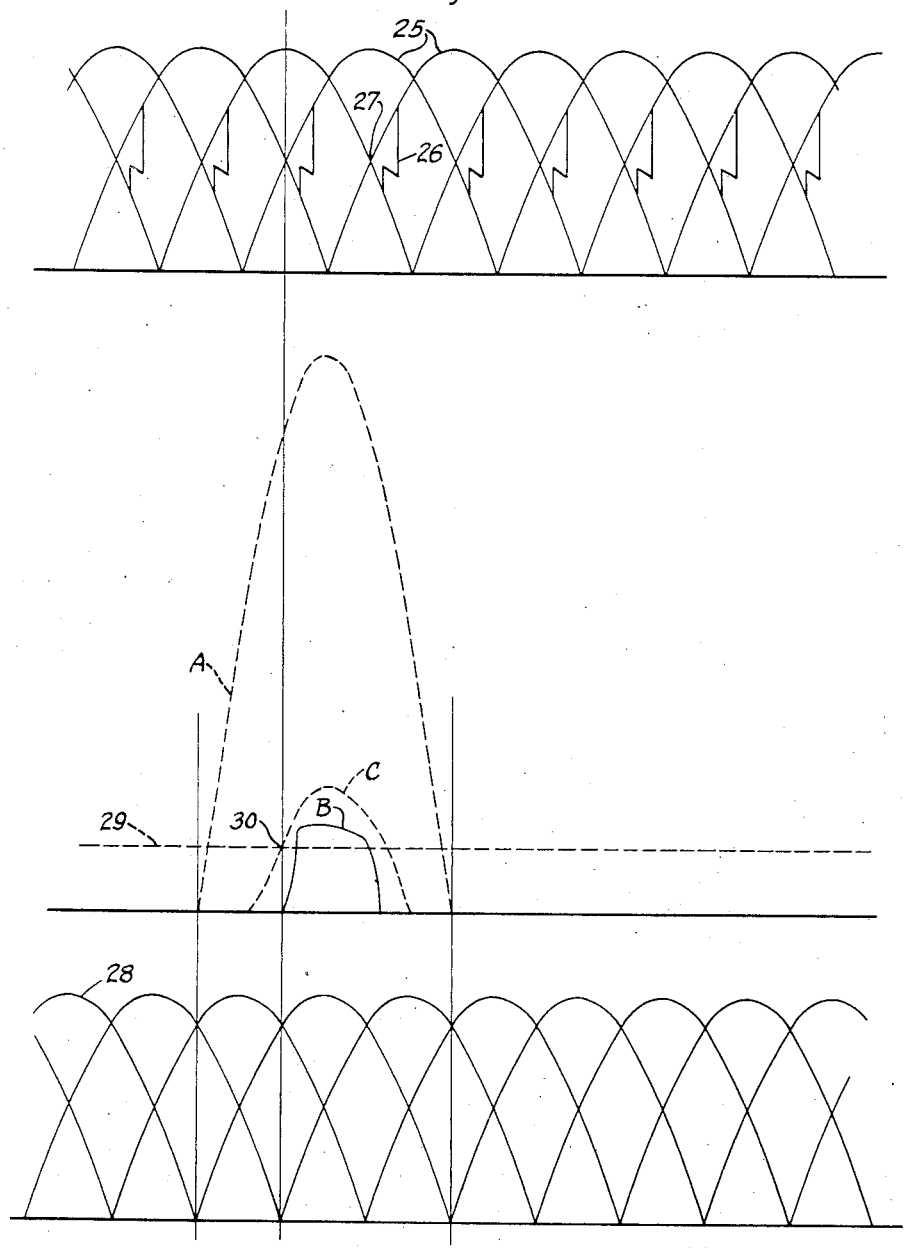
Fig. 3 is a diagrammatic illustration of the current and voltage conditions in a make-alive electrode and the associated control circuits.

The operation of my device is probably best understood by reference to a diagrammatic illustration of Fig. 3, in which the top curve 25 illustrates the voltages applied by the converter transformer 3 to the individual valves 5 of the converter. As illustrated, it is desired to commutate the valves 5 at a point 26 delayed from the point 27 which would produce the maximum voltage of a converter. For this reason, the potential of the actuating device 10 is shifted, as shown by the lower curve 28, so that the current flowing to the make-alive electrodes 6 will rise above the critical potential 29 at the point 30 where it is desired commutation of the valves 5 shall take place.

To further understand the operation of the valves 5 and the associated control device 10, I have shown certain auxiliary curves, of which the first curve A illustrates a theoretical but practically impossible condition in which the resistance 17 in the return circuit of the actuating transformer 10 is zero. Since there is assumed to be no resistance in the return circuit, the uni-directional conductor 15 in series with the phase winding of the actuating device will permit current flow throughout 180°. However, since it is apparent that this would overlap several commutating portions in the main valve 5, it is apparent that such a condition is undesirable, even if possible.

A more practical condition is shown by curve B in which the resistance 17 in the return connection is made very large with respect to the resistance 16 in the positive connection to the make-alive electrode 6, so that the uni-directional conductors 15 act as a six-phase converter and the current conduction in the several make-alive electrode circuits can occur only during the interval which would correspond to the conducting interval of a six-phase diametrical converter. As seen by the curve B, this current rises rapidly above the critical value 29 of the make-alive current, and is maintained for a relatively short interval of time, or until the normal commutation time of a six-phase converter would occur.

Curve C illustrates the possible working condition in which the resistance 17 of the return connection is larger than the resistance 16 in the make-alive circuit, but considerably less than the maximum resistance 17 of the return circuit. In this condition, the commutation between the valves of the converter will occur at a much earlier time and current will rise to a higher value, so that the actuating current rises above the critical potential 29 at an earlier time and remains for a longer period than when there is the maximum resistance 17 in the return connection.

It will usually be desirable to operate the device at some current such as illustrated by the curve C, then to shift the phase relation of the actuating potential 28 with respect to the potential 25 applied to the make-alive valves 5, in order to control the output potential of the converter. Then, in the event of an overload, the entire resistance 17 of the return connection may be inserted by any suitable means, such as relay 20, so that the make-alive current will be changed from C to B, with the result that the terminal voltage of the converter will be materially reduced, as from 27 to 26, which will tend to reduce the overload on the converter.

Figure 2:
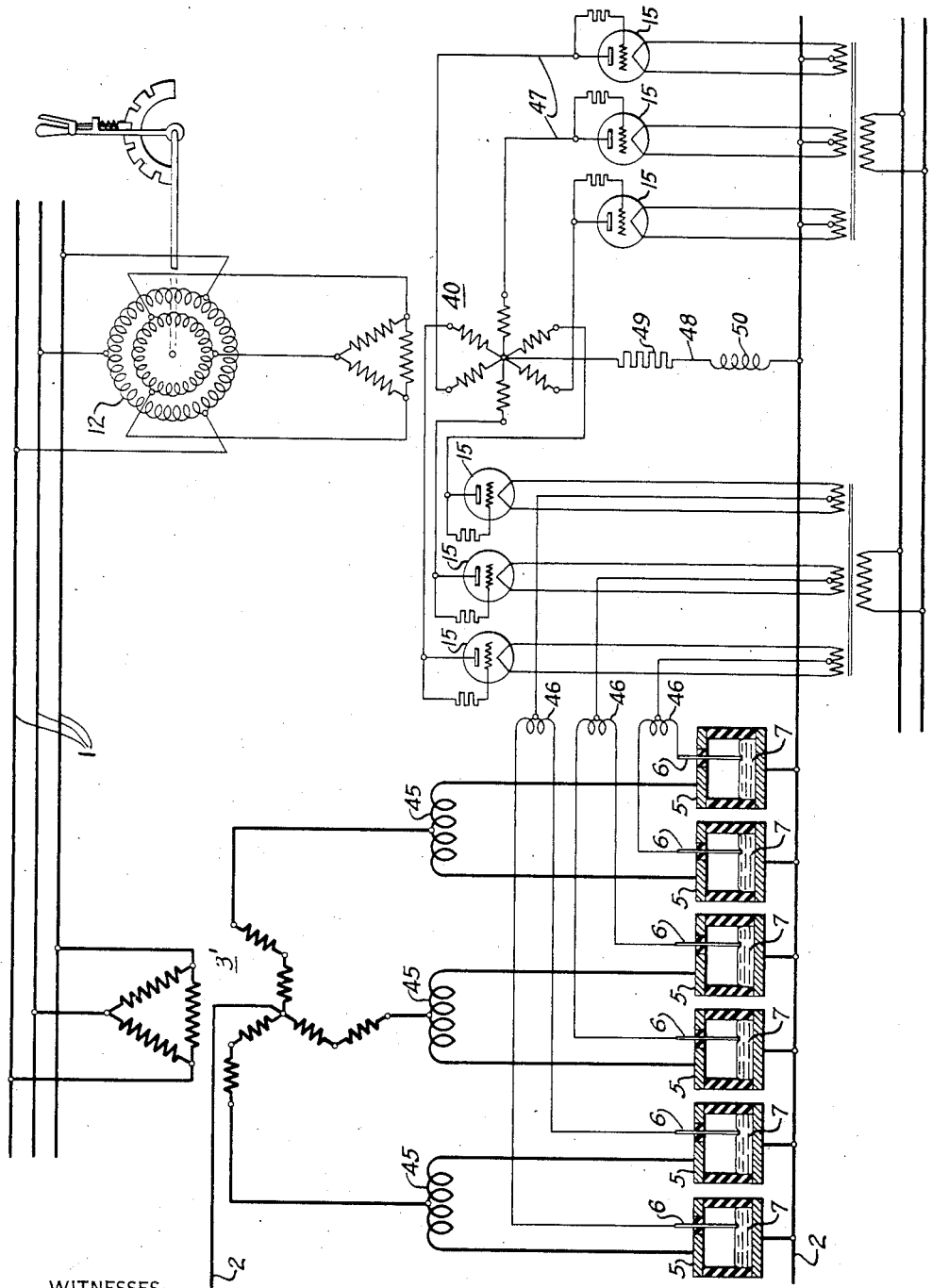
Fig. 2 is a similar illustration of a modification referring to my invention disclosing further means for reducing the conducting angle of the make-alive electrodes.

In the embodiment of my invention according to Fig. 2, I have shown a converter transformer 31 having only three operating phases. Thus, as such a converter transformer has a tendency to saturate because of the direct current in the secondary windings, it is desirable to provide a winding which will produce flux reverses of the core and prevent such saturation. Accordingly, I have illustrated the secondary windings as of the so-called zigzag type, in which separate portions of the secondary windings are placed on different portions of the transformer core.

The actuating device 40 according to this modification is provided with a multiple of phases greater than the phases of the converter transformer or at least double the phases of the converter transformer. As illustrated, the actuating transformer 40 is six-phase diametrical while the converter transformer 31 is three-phase zig-zag. Obviously, if the converter transformer was six-phase or greater, the actuating transformer would be twelve-phase or greater.

It is frequently desirable to sub-divide the effective valves 5 of a converter into two or more similar parallel discharge devices. This permits the building up of high current devices from a plurality of standard valves 5. However, whether the active phases of the converter discharge through one or more arc devices 5, it will be apparent that any number of parallel arc chambers may be operated as a single valve 5, if desired. When the individual valves 5 are made up of more than one of the make-alive type devices, suitable balance coils 45 are provided, to produce current division between the make-alive valves, and similarly, current dividers or balance coils 46 are provided between the phase terminals of the actuating device 40 and the make-alive electrodes 6 associated with the various make-alive valves. Preferably, the terminals of transformer 40 corresponding in phase position to the phases of the converter transformer 31 are connected to the make-alive circuits by means of suitable valves 15. Likewise, remaining terminals are connected to auxiliary circuits 47 controlled by similar valves.

The return circuit 48 of the actuating device is then provided with a suitable resistance 49 and impedance device 50 so that the current is maintained and the current in the individual make-alive and auxiliary circuits are transferred as would be the case with the six-phase diametrical converter. As the alternate phase terminals of the actuating device 40 are connected to the respective make-alive electrodes, it will be apparent that current will flow first to one of the make-alive electrodes 6, and then to one of the auxiliary circuits 47, so that current flows successively between make-alive electrodes and the auxiliary circuit. It will thus be seen that the conducting interval of the make-alive electrodes 6 will be reduced with respect to the conducting interval of the valves 5 of the converter. Obviously, the phase of the output potential of the actuating device may be shifted by the induction regulator 12 to produce any desired output potential for the converter.

Figure 4:
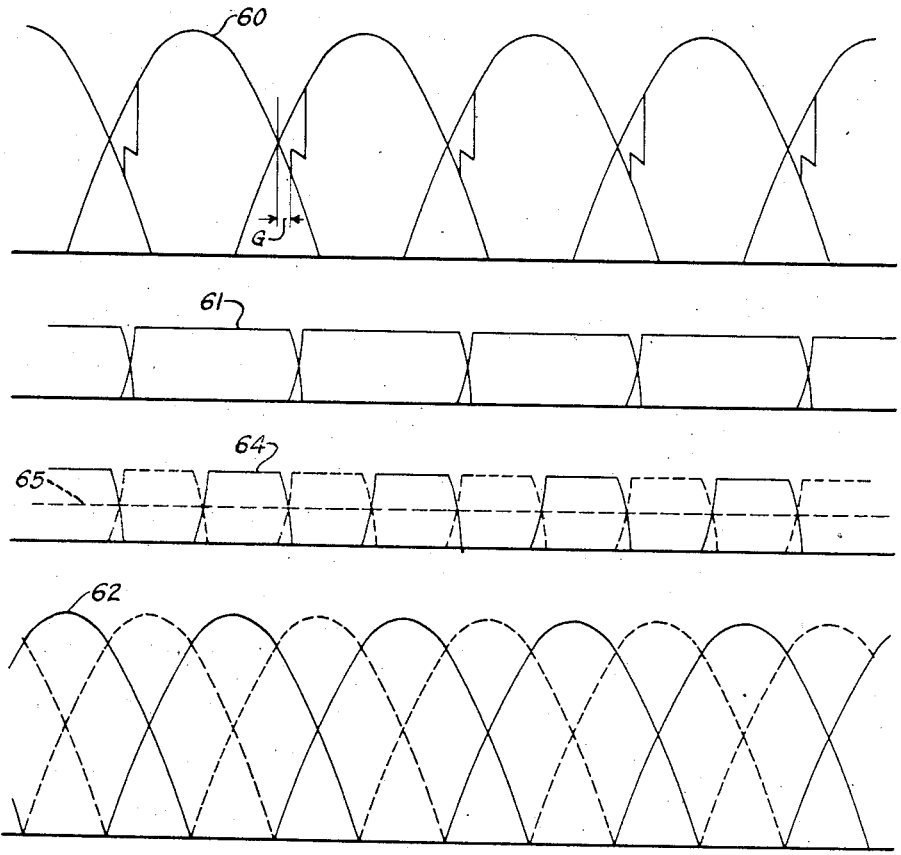
Fig. 4 is a similar diagrammatic illustration of the current and voltage conditions in the system according to Fig. 2.

The operation of this modification of my invention is most easily understood with reference to the diagram of Fig. 4, in which the upper curve 60 illustrates the potentials applied to the valves 5 of the make-alive device. The commutation period is delayed by a suitable angle G and is maintained over the necessary angle. The current of the main converter valves 5 is then as shown by the second curve 61. The terminal potential 62 of the actuating device 40 is shifted to any desired angle by the induction regulator 12 so that the make-alive current 64 rises above the critical potential 65 at the desired time to produce commutation at the desired interval. Since the alternate phase terminals of the induction regulator are connected to the make-alive electrodes 6 and the auxiliary circuit 47, it will follow that the current from the actuating device 40 will flow first through the make-alive electrodes 6 and then through the auxiliary circuit 47, so that only the portions of the circuit 64 indicated by solid lines will be delivered to the successive make-alive electrodes 6, while the current indicated by the dotted curves will be supplied to the auxiliary circuit 47.

While for purposes of illustration I have shown and particularly described two embodiments of my invention, it will be apparent to those skilled in the art that many changes and modifications can be made therein without departing from the true spirit of my invention or the scope of the appended claims.

I claim as my invention:

1. An electric conversion system comprising an electric supply circuit, an electric load circuit, a plurality of make-alive type valves for controlling the flow of energy between said circuits, a make-alive electrode for each of said valves, a source of actuating current for said make-alive electrodes, a transformer for supplying current from said source to said electrodes, connections from alternate phase terminals of said transformer to said make-alive electrodes, connections from the remaining terminal to an auxiliary load, electric valves in said connections, said valves being so arranged that current flows alternately to said make-alive electrodes and said auxiliary load.

2. An electric conversion system comprising a polyphase alternating-current circuit, a direct-current circuit, a polyphase main transformer interconnecting said circuits, a valve type converter for controlling the transfer of energy between said circuits, a make-alive electrode in each valve of said converter, a source of polyphase actuating current for said make-alive electrodes, a transformer for distributing current from said source to said electrodes, said transformer having a secondary winding providing operating phases which are a multiple of the operating phases of the main transformer, the phase terminals of said distributing transformer corresponding substantially to the phases of the main transformer being connected to the respective make-alive electrodes of the valves of the converter, the remaining phase terminals of said distributing transformer being connected to an auxiliary circuit and a uni-directional conductor associated with each phase of said distributing transformer.

3. An electric conversion system comprising a direct-current circuit, an alternating-current circuit, a transformer connected to both said circuits, a plurality of electric valves for transferring energy between said circuits, a make-alive electrode in each of said valves, a source of alternating-current for actuating said make-alive electrodes, an actuating device for supplying current from said source to said electrodes, control circuits connecting the phase terminals of said device with the make-alive electrodes, auxiliary valves for controlling current flow in said control circuits, a relatively low resistance in each of said control circuits, a relatively high resistance common to all of said control circuits and means for varying said relatively high resistance for controlling duration of current flow through said control circuits.

4. An electric conversion system comprising a direct-current circuit, an alternating-current circuit, a transformer connected to both said circuits, a plurality of electric valves for transferring energy between said circuits, a make-alive electrode in each of said valves, a source of alternating-current for actuating said make-alive electrodes, an actuating device for supplying current from said source to said electrodes, control circuits connecting the phase terminals of said device with the make-alive electrodes, auxiliary valves for controlling current flow in said control circuits, a relatively low resistance in each of said control circuits, a relatively high resistance common to all of said control circuits, means for varying said relatively high resistance for controlling duration of current flow through said control circuits, and means for shifting the phase relation of the currents supplied by said actuating device.

5. An electric conversion system comprising a polyphase electric circuit, a direct-current circuit, a polyphase transformer connected to said circuit, an electric valve converter for transferring energy between said circuits, a make-alive electrode in each valve of said converter, a source of actuating current for said electrodes, an actuating transformer connected to said source, said actuating transformer having at least as many phase terminals as there are effective phases in said converter, connections from the phase terminals of said actuating transformer to said make-alive electrodes, uni-directional conductors in each of said connections, a return connection from said make-alive electrodes to said actuating transformer, a resistor element in each of said connections, a resistor element in said return circuit, said second-mentioned resistor element having a greater resistance value than said first-mentioned resistor elements, and means for varying the resistance values of said second-mentioned resistor element.

6. An electric conversion system comprising a three-phase alternating-current circuit, a direct-current circuit, a main transformer connected to both said circuits, said transformer having a winding arrangement such as to prevent saturation of the flow of unidirectional currents in said winding, a valve-type converter for transferring energy between said circuits, a make-alive electrode in each of the valves of said converter, a source of actuating current for said make-alive electrodes, a phase multiplying device connected to said source, said device producing a plurality of phases which are a multiple of the operating phases of the converter, means for connecting certain of the phases of the phase multiplying device to the make-alive electrodes, and the remainder of the phases to an auxiliary circuit.

7. An electric conversion system comprising a three-phase alternating-current circuit, a direct-current circuit, a main transformer connected to both said circuits, said transformer having a winding arrangement such as to prevent saturation of the flow of unidirectional currents in said winding, a valve-type converter for transferring energy between said circuits, a make-alive electrode in each of the valves of said converter, a source of actuating current for said make-alive electrodes, a phase multiplying device connected to said source, said device producing a plurality of phases which are a multiple of the operating phases of the converter, means for connecting certain of the phases of the phase multiplying device to the make-alive electrodes, and the remainder of the phases to an auxiliary circuit, and means for shifting the phase relation of the currents supplied by said phase multiplying device.

8. A control system for a make-alive type valve device comprising a make-alive electrode in each valve of said device, a source of actuating potential for said electrodes, an actuating device for distributing current from said source to said electrodes, an actuating circuit from said device to each of said electrodes, a resistor element in each of said circuits, means for producing uni-directional current flow in said actuating circuits, a return circuit from said electrodes to said actuating device, a resistor element in said return circuit, the relative resistance values of said resistor elements determining the duration of current flow through said actuating circuit, and phase shifting means for shifting the time of commencement of current flow through said actuating circuits.

9. A control system for a make-alive type valve device comprising a make-alive electrode in each valve of said device, a source of actuating potential for said electrodes, an actuating device for distributing current from said source to said electrodes, an actuating circuit from said device to each of said electrodes, a resistor element in each of said circuits, means for producing uni-directional current flow in said circuits, a return circuit from said electrodes to said device, a resistor element in said return circuit, the relative resistance values of said resistor elements determining the duration of current flow through said actuating circuit, said resistor means being variable to vary the duration of current flow through said actuating circuits.

10. A vapor-electric conversion system comprising an electric valve converter of the make-alive type, a direct-current circuit, an alternating-current circuit, a main transformer connecting said circuits and said converter, a make-alive electrode for each valve of said converter, a source of actuating potential for said make-alive electrodes, an actuating transformer having a plurality of operating phases which are a multiple of the operating phases of the main transformer, an auxiliary circuit, means for connecting predetermined phases of said actuating transformer to said make-alive electrodes, means for connecting the remaining phases of said actuating transformer to said auxiliary circuit, said connections being such that current flows successively to said make-alive electrodes and said auxiliary circuit.

11. A vapor-electric conversion system comprising an electric valve converter of the make-alive type, a direct-current circuit, an alternating-current circuit, a main transformer connecting said circuits and said converter, a make-alive electrode for each valve of said converter, a source of actuating potential for said make-alive electrodes, an actuating transformer having a plurality of operating phases which are a multiple of the operating phases of the main transformer, an auxiliary circuit, means for connecting predetermined phases of said actuating transformer to said make-alive electrodes, means for connecting the remaining phases of said actuating transformer to said auxiliary circuit, said connections being such that current flows successively to said make-alive electrodes and said auxiliary circuit, and means for shifting the phase relation of the current supplied by said actuating transformer.

12. An electric translating system comprising a valve type converter, a direct-current circuit and an alternating-current circuit connected to said converter, a make-alive electrode in each valve of said converter, a source of actuating potential for said converter, an actuating device having a plurality of phase terminals corresponding to the effective number of valves in said converter, said phase terminals being connected to the make-alive electrodes in the respective valves, a return connection from said electrodes to said device, auxiliary valves in series with each of said electrodes, and a resistor connected to said device for controlling the interval of current flow to the several make-alive electrodes, a circuit connected across part of said resistor, means for opening and closing said circuit, and means responsive to the load condition on said converter for operating said first-mentioned means.

13. An electric conversion system comprising a direct-current circuit, an alternating-current circuit, a plurality of make-alive type electric valves for transferring energy between said circuits, a make-alive electrode for each of said valves, a source of actuating current for said make-alive electrodes, a phase multiplier connected to said source, said phase multiplier providing a plurality of phases, said phases being in excess of the number of phases applied to said valves, means for connecting certain phase terminals of said phase multiplier to said make-alive electrodes, means for connecting the remaining phase terminals of said phase multiplier to an auxiliary circuit, and auxiliary valves connected in series with each phase terminal of said phase multiplier.

14. An electric translating system comprising a valve type converter, an alternating-current circuit, a direct-current circuit, a converter transformer connected to said circuits and said converter, a make-alive electrode in each valve of said converter, a source of actuating current for said make-alive electrodes, an actuating transformer having as many effective phases as there are effective phases in said converter transformer, connections for supplying current from said actuating transformer to the several make-alive electrodes, a resistor in the positive connection to each of said electrodes, a second resistor in the return connection of said electrodes, said second resistor being of greater resistance value than said first-mentioned resistors, and means for varying the resistance value of said second resistor.

15. An electric translating system comprising a valve type converter, an alternating-current circuit, a direct-current circuit, a converter transformer connected to said circuits and said converter, a make-alive electrode in each valve of said converter, a source of actuating current for said make-alive electrodes, an actuating transformer having as many effective phases as there are effective phases in said converter transformer, connections for supplying current from said actuating transformer to the several make-alive electrodes, a resistor in the positive connection to each of said electrodes, a second resistor in the return connection of said electrodes, said second resistor being of greater resistance value than said first-mentioned resistors, means for varying the resistance value of said second resistor, a circuit connected in shunt with a portion of said second resistor, a relay responsive to the load condition on said converter, and means actuated by said relay for opening or closing said shunt circuit.

HERBERT A. ROSE.